(12) United States Patent
Glynn

(10) Patent No.: US 6,647,458 B1
(45) Date of Patent: Nov. 11, 2003

(54) BENCHMARK TOOL WRITE ANALYSIS FOR A MASS STORAGE SYSTEM

(75) Inventor: William Glynn, Sherborn, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/542,463

(22) Filed: Apr. 4, 2000

(51) Int. Cl.[7] .............................................. G06F 12/00
(52) U.S. Cl. ........................... 711/112; 714/37; 714/43; 714/718; 714/719; 714/814; 714/815; 702/186
(58) Field of Search ............................ 711/112; 714/37, 714/41, 43, 718, 719, 814, 815; 702/186

(56) References Cited

U.S. PATENT DOCUMENTS 5,953,689 A * 9/1999 Hale et al. .................. 702/186
6,480,904 B1 * 11/2002 Kato et al. ..................... 710/6

* cited by examiner

*Primary Examiner*—Donald Sparks
*Assistant Examiner*—Ngoc Dinh
(74) *Attorney, Agent, or Firm*—Hale and Dorr LLP

(57) ABSTRACT

A method for automatically finding the transition interval from a fast write to a delayed fast write, in a mass storage system in which the mass storage system has a plurality of disk drive storage elements controlled by a disk drive controller, the controller having a cache memory through which all data writes pass, and the controller receiving commands and data from at least one host computer.

12 Claims, 9 Drawing Sheets

Write Test

Write Test

Write Test—No Transition

BENCHMARK TOOL WRITE ANALYSIS FOR A MASS STORAGE SYSTEM

BACKGROUND

The invention relates generally to tools for measuring the performance of mass storage systems, and more particularly, to a method and apparatus for measuring the write performance, from an input source, to a plurality of the disk drive elements controlled through a controller cache.

As the size and complexity of computer systems increase, including both of the number of host computers and the number and size of disk drive elements, it becomes increasingly important to measure and understand the functions and parameters which affect the write performance of the system. The performance of the system can be typically measured in terms of input/output (I/O) response times, that is, the time it takes for a read or write command to be acted upon, as far as the host computer is concerned, by the disk drive controller system.

It is well known, in the field, to measure, usually using a single parameter, the instantaneous or average response time of the system. Typically, a host computer outputs one or more I/O requests to the disk drive controller, and then measures the time for a response to be received from the disk drive controller. Alternatively, the number of I/O's processed per second, as a function of time is another performance measure of the system.

It is well known that a disk controller, using a cache memory in its write process, can have substantially different write time responses depending upon the availability of cache memory. An average response (the average of, for example, a write where cache was available and one where cache was not available) would be misleading and meaningless.

Nevertheless, write performance is one important aspect of system performance. In one approach to measure write performance, the cache is first flushed and then write requests are issued to the storage system by attached hosts. When there is sufficient free space in the cache, the data is written to the cache and immediately acknowledged to the host. When there is not sufficient space in the cache, the write to cache is delayed until a cache slot is destaged to a disk drive, and then the data is written to cache and acknowledged to the host. The former I/O is called a fast write, and the later, a delayed fast write. Current performance tools can collect the number of I/Os completed in successive, fixed width, non-overlapping, time intervals from which plots of the I/O rate as a function of test time are made. By default these time intervals, or bins as they are called, can be 0.25 seconds in length. FIG. 1 is an example of such a plot and shows a situation of an initial fast write period of high I/O rate followed by a delayed fast write period of lower I/O rate. These plots are then analyzed manually to determine, for example, when the transition from the fast write to the delayed fast write occurs.

Reporting a single I/O rate for a write test when a transition from fast write to delayed fast write has occurred can be very misleading. Depending on the length of the test one could get any value from the initial high I/O rate to the lower post-transition I/O rate. For this reason two numbers are reported: a fast write I/O rate and a delayed fast write I/O rate. These are computed by presenting the human analyst with a series of graphs, such as FIG. 1, on a computer monitor, for every write test. He or she then uses the mouse to indicate the start and end points of the fast write and, when a transition occurred, the delayed fast write intervals. This procedure works quite well for a small number of tests; however, in a full set of tests of a system, there are typically several hundred write tests and manually selecting that many end points soon becomes tedious and error prone.

SUMMARY

The invention relates to a method for measuring the system write performance of a mass storage system having a plurality of disk drive storage elements controlled by a disk drive controller. The disk drive controller has a cache memory. The controller receives at least write commands and data from, and returns at least data to, a plurality of host computers. The method features clearing a data storage area of the cache memory; sending test results representing write times for storage of received data to a system analysis program; quantizing the write times data to generate a representation of an I/O rate vs. quantized time relationship; and automatically determining a fast write to delayed fast write transition interval, if any, in said write times data.

In particular embodiments, the invention features initializing the conroller cache memory to a known state prior to sending of the write commands, analyzing, at the one host computer, performance data of the transition interval data, and generating a write analysis of the system performance. Further, the invention features determining, for the test results, the number I/O writes as a function of time for the mass storage system, and deleting at least one of a beginning period of test data and a ending period of the test data from use in determining the location of any transition.

In another aspect, the invention relates to software stored on a computer readable medium to perform the function of measuring write system performance in a mass storage system. The storage system has a plurality of disk drive storage elements controlled by a disk drive controller, the controller receiving at least write commands and data from at least one host computer and using a cache memory in which all received data is stored and from which it is destaged. The function features clearing a disk storage area of the cache memory, sending test results representing write times for storage of received data to a system analysis program, quantizing the write times data to generate a representation of an I/O rate vs. quantized times, and automatically determining a fast write to delayed fast write transition interval in the write times data.

Advantageously, therefore, the system provides for automatically characterizing the write performance of the mass storage system, from the host computers to the disk drive elements, concentrating upon cache performance effects. The method and apparatus of the invention further advantageously enable the user to check determinations of the automatic system for consistency, accuracy, and effectiveness.

DESCRIPTION OF DRAWINGS

Other features and advantages of the invention will be apparent from the following description, taken together with the drawings, in which.

DETAILED DESCRIPTION

Figure 2:
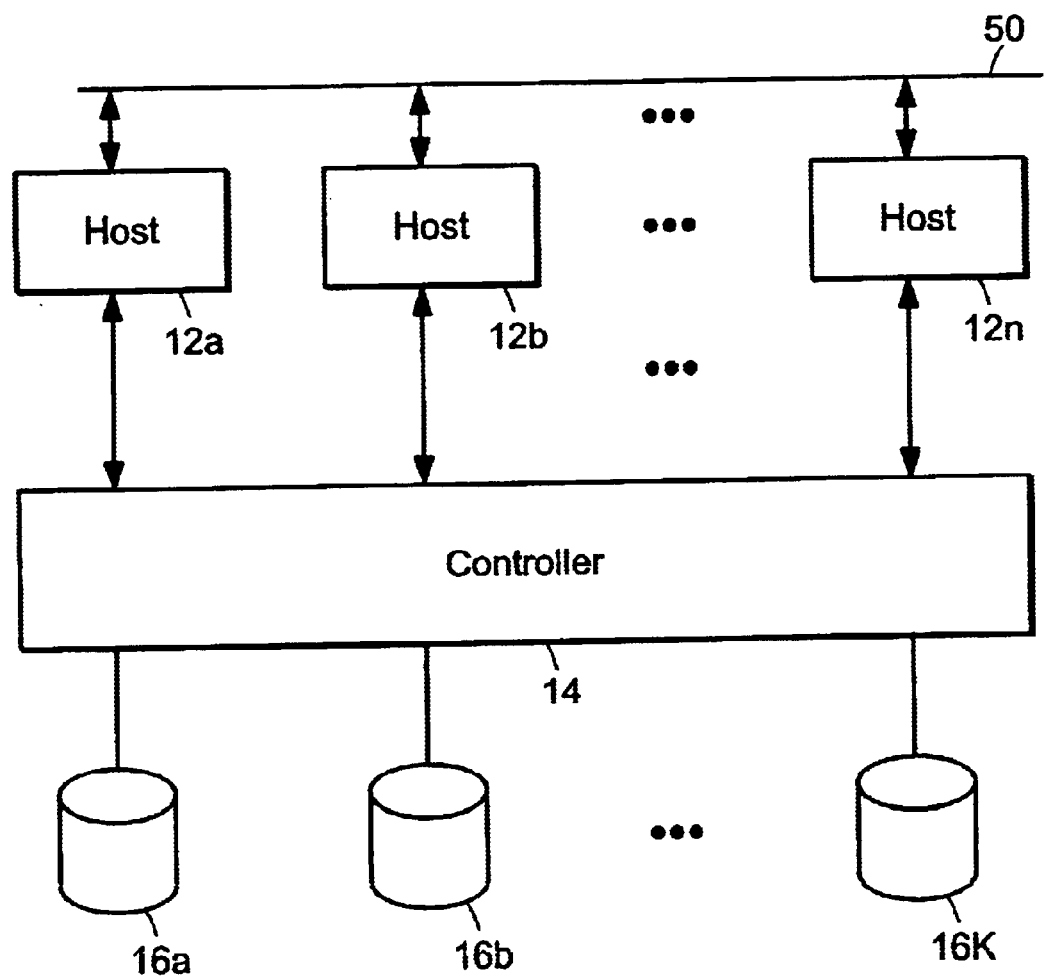
FIG. 2 shows a typical system in which the invention is useful.

Referring to FIG. 2, the invention relates to a computer system wherein a plurality of host computers or processors 12a, 12b, . . . , 12n, connect to a storage controller system 14, such as the EMC Symmetrix® storage system. The controller acts as the interface between the host computers and a plurality of mass storage devices, such as, for example, disk drive elements 16a, 16b, . . . , 16k. Data written by the host or read from the disk drive elements passes through the memory controller system which acts a two way communications path with substantial capabilities. The disk drive elements can have any of, or a combination of, a plurality of configurations. For example, in some systems, the data from a host is uniformly striped across all of the disk storage devices; and in other systems, the data from a host is stored on the disk drives 16 according to a RAID protocol. In yet other embodiments of the invention, all of the data from a particular host may be stored in a logical volume on a single disk drive or allocated to different logical volumes of the same or different disk drives, depending upon the nature and the source of the data and host. A host computer can also read data from one or more of the disk drive units to generate a single host logical volume.

To determine the limits of performance in the system, the hosts can, according to the invention, be operated to exercise and test the memory controller and the disk drive elements. Thus potential problems which can create a bottleneck on those communication lines connected from the disk drive controller to either the disk drive elements or the hosts can be identified, as can cache memory loading issues in the drive controller.

Figure 1:
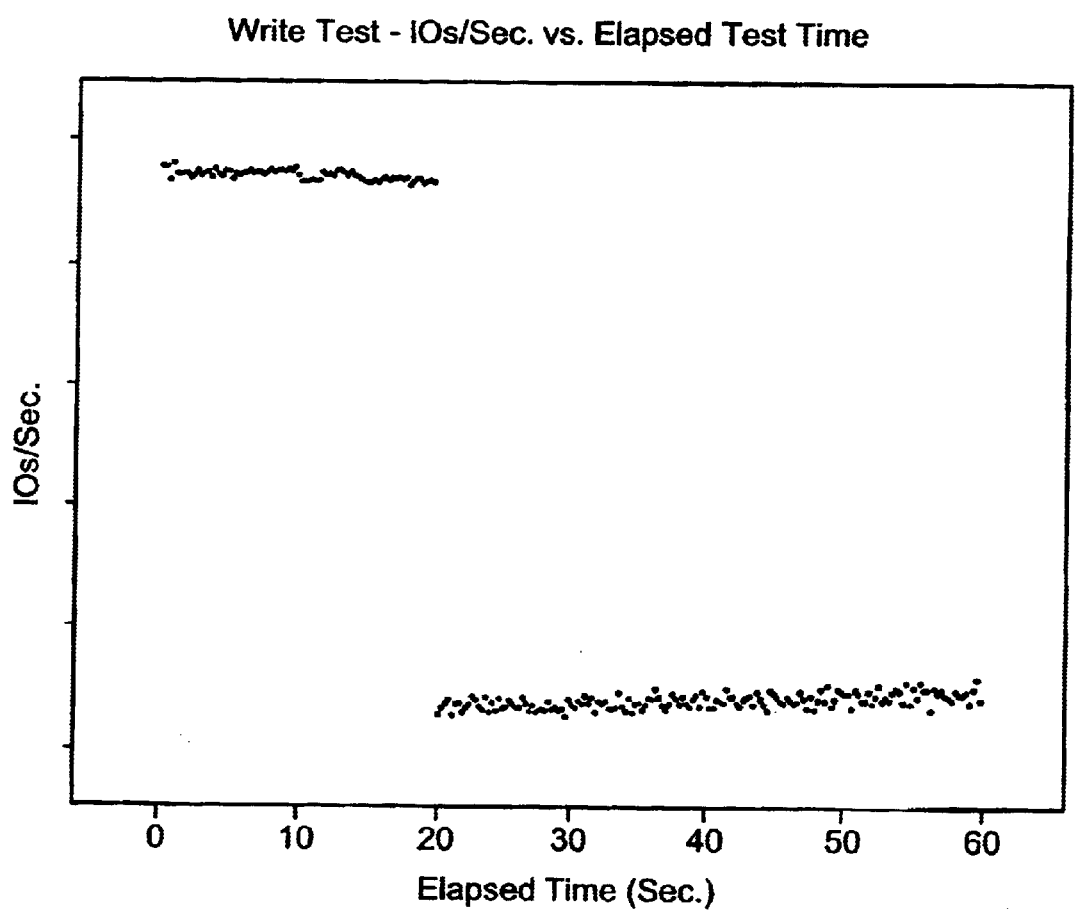
FIG. 1 is a plot of I/O's versus time for a storage system.
Figure 3:
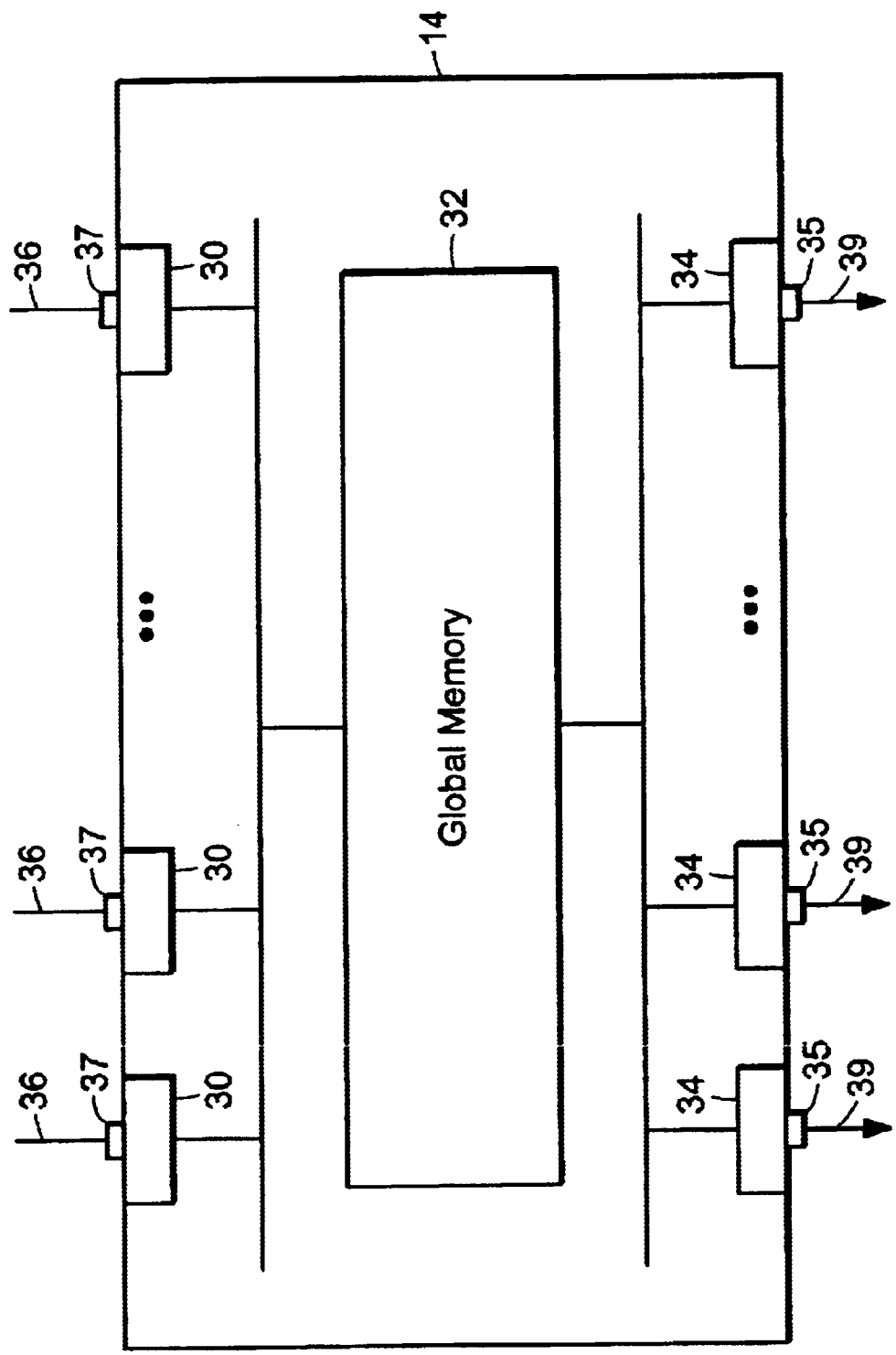
FIG. 3 shows, in more detail, a particular controller system in which the invention finds particular use.

Referring to FIG. 3, in a particular embodiment according to the invention, the disk controller has a plurality of host adaptors (also referred to as channel directors, fiber adaptors (FA's), or SCSI adaptors (SA's)) 30 connecting to a global memory 32 through which, in this embodiment, all data and commands flow. The global memory 32 is connected to a plurality of disk adaptors (also referred to as DA's or disk directors) 34 which connect the disk drives 16 to storage or drive ports 35 of the adaptors 34 over lines 39. In accordance with this particular embodiment of the invention, each host adaptor has a SCSI adaptor embedded therein which communicates with the global memory 32. In the illustrated embodiment, the read and write operations pass through each SCSI adaptor unit of the host adaptors, to memory 32, and then to the disk adaptors to the disk drive elements. Each host adaptor connects to one or more host computers over buses 36 at host processor ports 37 of the host adaptors. The host processors also can communicate with each other, for example over a SCSI bus 50 (FIG. 1). The memory 32 is a large cache memory, for example 2 gigabytes.

As noted above, FIG. 1 represents a plot of the number of writes per second versus elapsed time. If all of the plots looked like FIG. 1, then the estimation of the fast and delayed fast intervals would be simple. The intervals in FIG. 1 are easy to identify because:

1. The I/O rate is fairly constant in both the fast write and delayed fast write intervals. More specifically, the variation of the I/O rate in both intervals is small with respect to the difference in average fast write I/O rate and average delayed fast write I/O rate and there are no trends in the I/O rates over time.

2. The difference between fast write and delayed fast write I/O rates is large and the transition from fast write to delayed fast write occurs from one time interval to the next.

3. There are no outliers.

Figure 4:
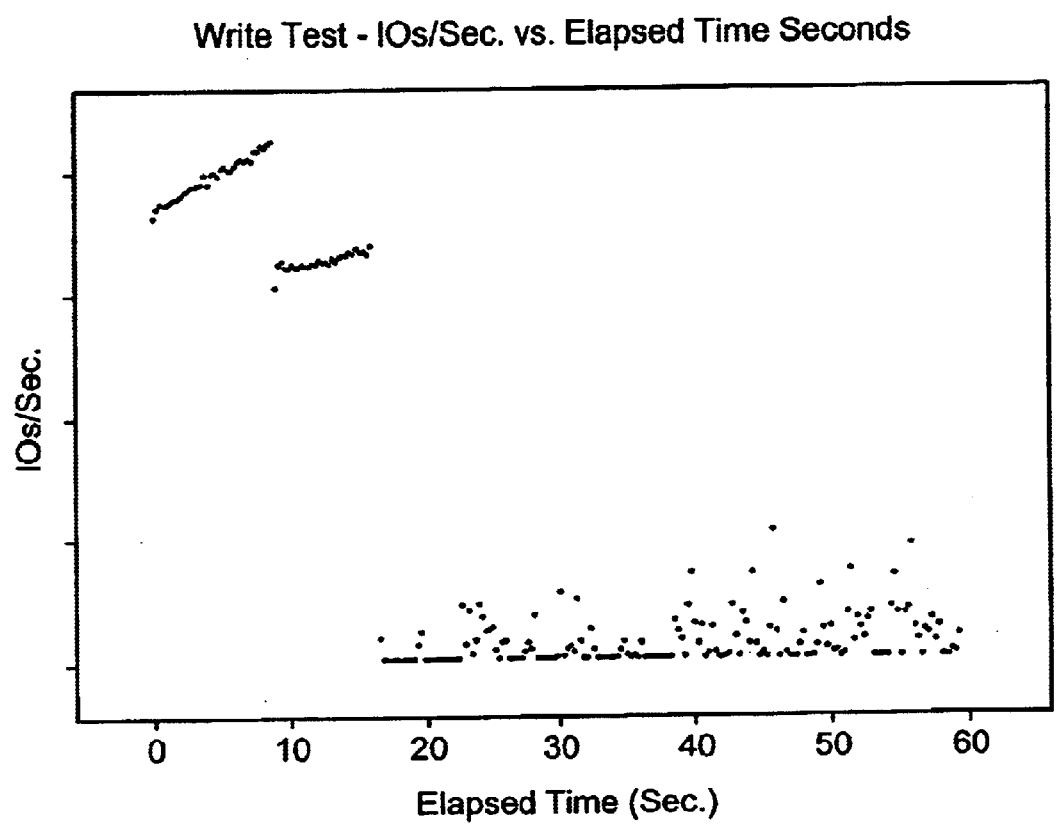
FIGS. 4–6 are plots of I/O's versus time for a storage system.
Figure 5:
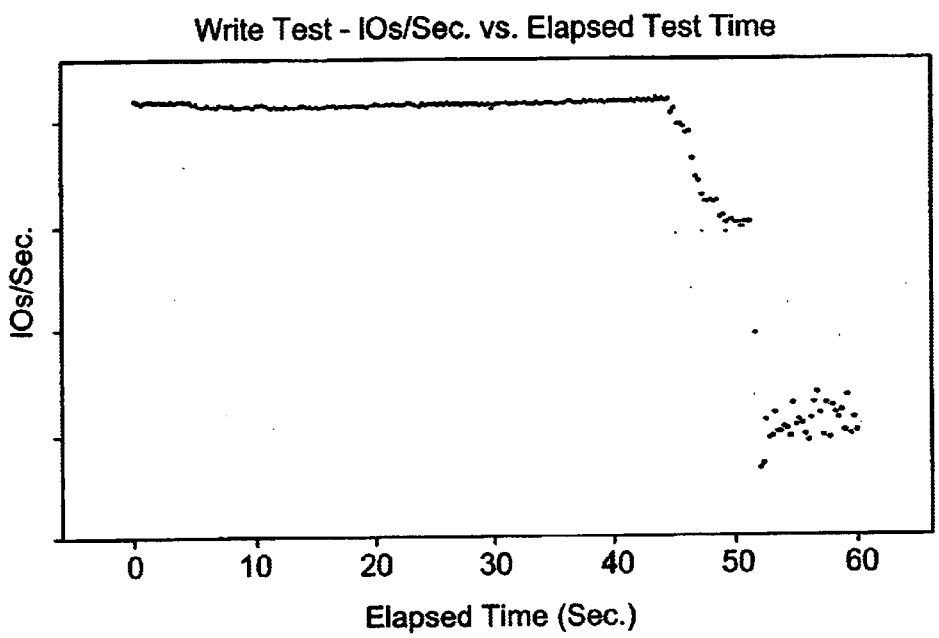
Figure 6:
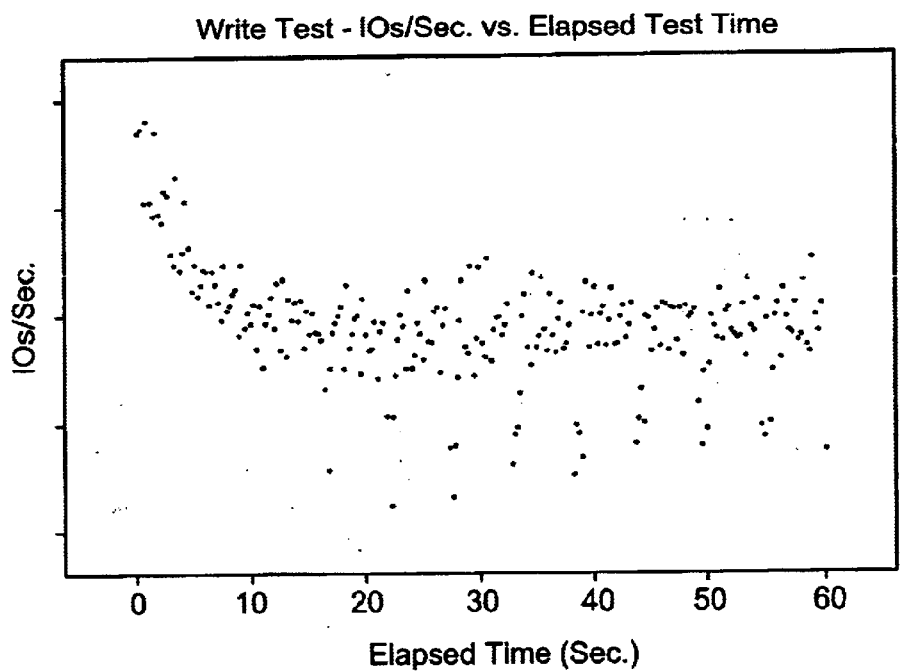

In practice, many intervals do not satisfy one or more of these criteria. FIGS. 4–6 illustrate some examples of these "other" types of circumstances.

The method of the invention automatically identifies the transition from a fast write interval to delayed fast write interval by using the data presented in the plot of I/O rate vs. elapsed test time. Since in a transition, from fast write to delayed fast write, there is a drop in I/O rate, and this decreased I/O rate persists, the input to the method of the invention is a vector of I/O completions, or bin counts as they can be called, in each successive "bin" time interval in the test. Since the bin time intervals are of fixed duration, for example, 0.25 seconds by default, and are long with respect to the average time of an I/O, a bin count (the number of acknowledged I/O's in the bin interval) is approximately proportional to the I/O rate in the interval. The first bin time interval starts at the first point of a sequence of writes and the last interval ends at the last point of the sequence of writes. The objective is to first determine if there is a transition time interval from fast write to delayed fast write, and if there is, to determine the first and last points of the transition interval.

The basic concept behind the inventive method is to examine differences or gaps in the bin counts. A gap is defined as a first occurring bin count minus a later occurring one. The gaps are determined for consecutive bin counts and for bin counts separated by different numbers of bin intervals. The number of bins from the first occurring bin interval to the second later bin interval is used to define a gap and is the length of the gap. A gap can be, or include, a corresponding transition interval. In practice a transition occurs in a short time interval so only gaps of length no greater than a specified length are considered. By default, this length is 12, which corresponds to 3 seconds when the default bin width size of 0.25 seconds is used.

Figure 7:
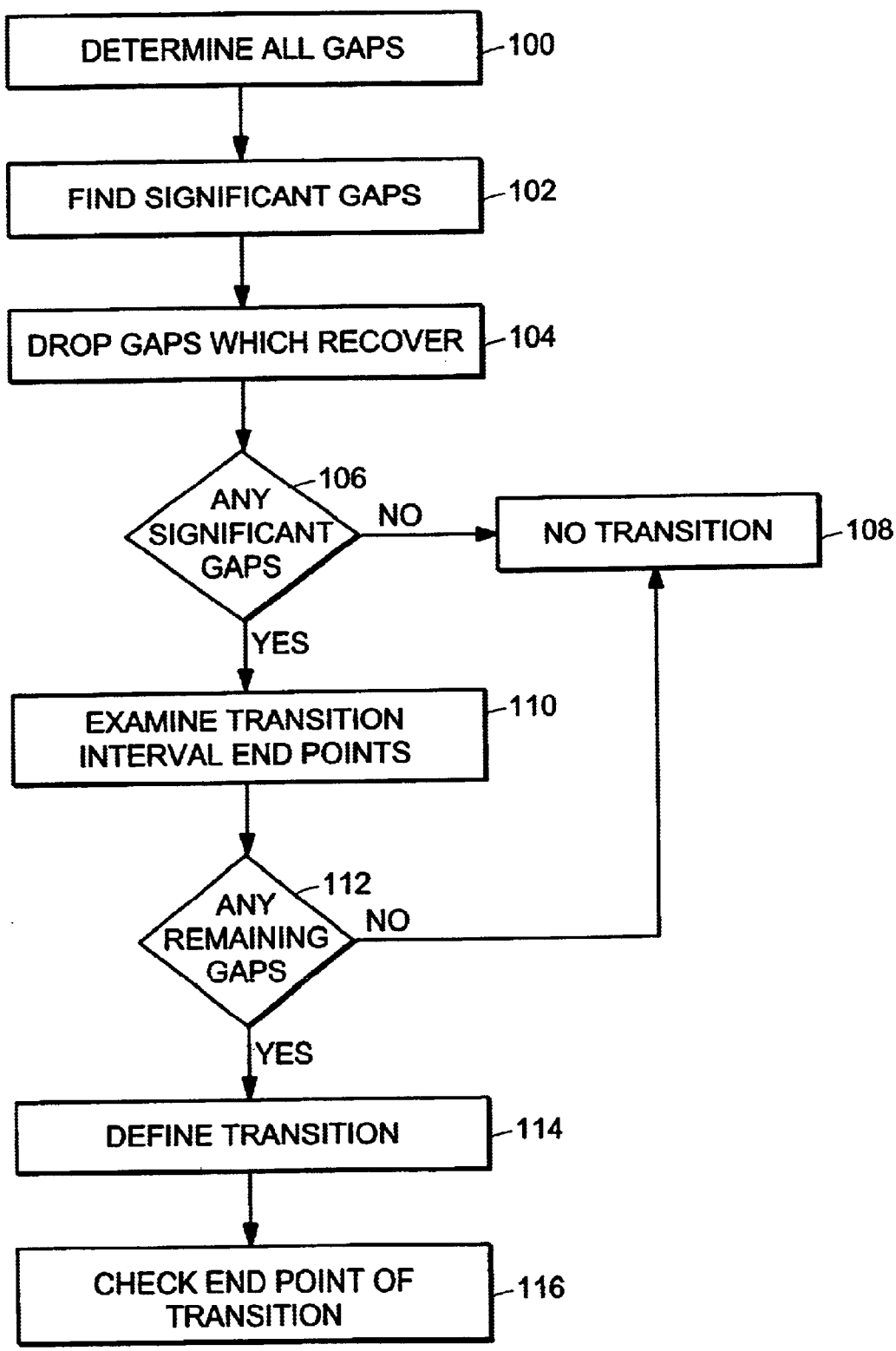
FIG. 7 is a flow chart showing overall operation of the invention.

Referring to FIG. 7, the basic steps in the method are as follows:

1. Determine, at 100, all gaps of length 1 through the maximum length.

2. Determine, at 102, which of the gaps are significant. In this example, significant shall be defined below. These are the gaps which are candidates for the transition interval.

3. Examine, at 104, each significant gap determined in 2 above, to determine if the I/O rate drop persists or if it recovers, that is, returns to near its original value. If the I/O rate drops significantly at the i-th bin count, but then recovers then the gap starting at the i-th point does not indicate a real transition. If there is a recovery, the method drops all gaps which start with the i-th point.

4. If the largest of the remaining gaps is "large" enough, at 106, then continue processing the gaps; otherwise, conclude that there is no transition (108).

5. Examine, at 110, the end points of the remaining significant gaps. If the I/O rate after the end point of the gap is not significantly different than the I/O rate in the transition interval, then the end point is not the end point of a real transition interval. The test is similar to 3 above, except here the end point of the transition interval is the focus. The method will then drop all gaps with a sufficient number of high I/O rate bins after the tentative transition interval end point.

6. If there are no remaining gaps, at 112, then conclude that there is no transition; otherwise move the left end point of each remaining tentative transition gap as far to the right as possible without losing significant gap (count) size. This is an attempt to make a small adjustment to the first point of the transition gap to find the true starting point.

7. Use the most significant remaining gap to define the transition interval (114).

8. If the end point of the selected transition interval occurs within a specified number of bins of the end of the test, by default, for example, 40 bins, then only return a fast write interval (116). If the delayed fast write interval is too short, then the resulting estimated delayed fast write I/O rate is probably not very reliable. By not displaying an estimated delayed fast write interval on a displayed graph, the human user is alerted of this probable unreliability.

Figure 8:
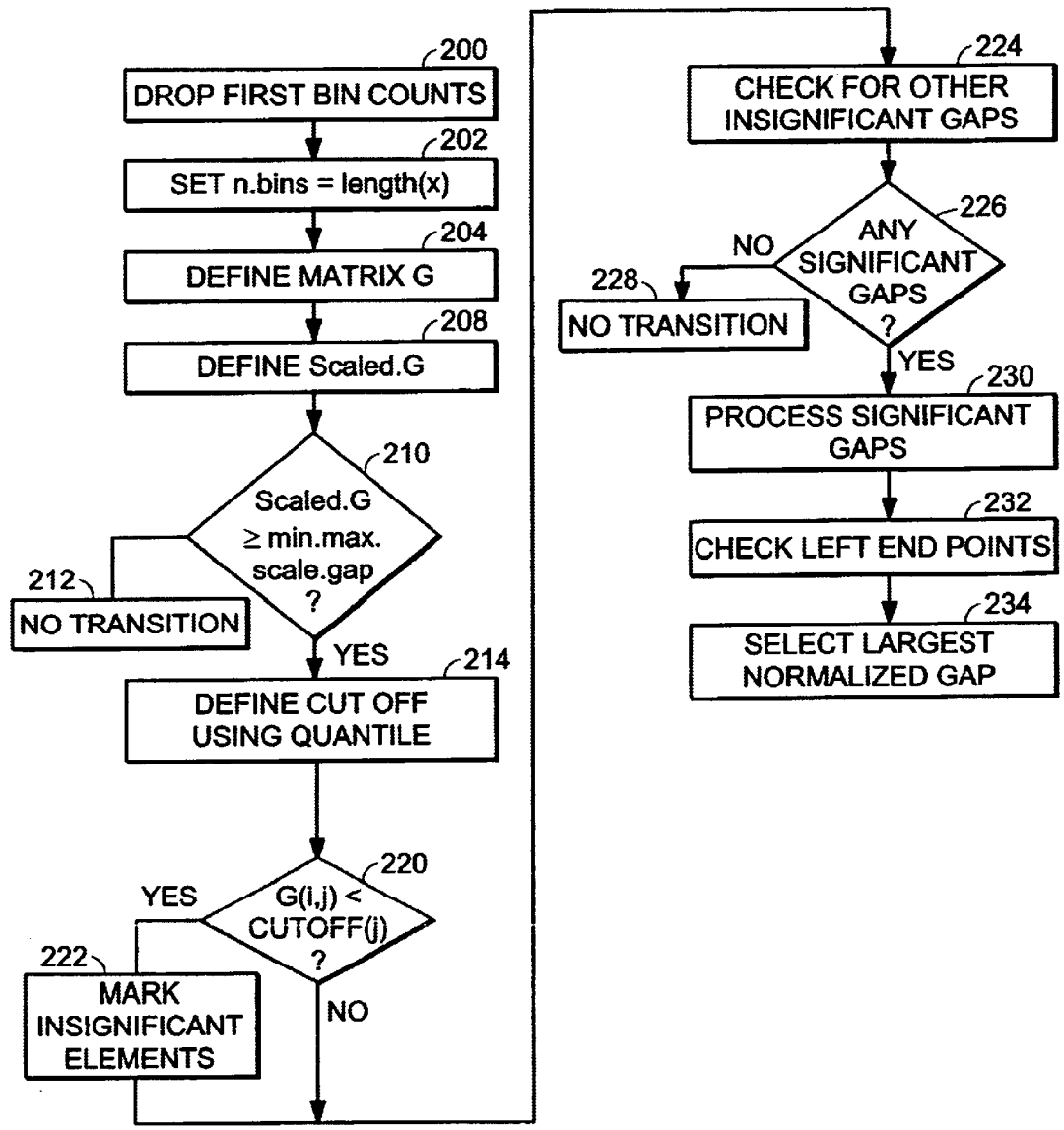
FIG. 8 shows a more detailed flow chart in accordance with the invention.

Referring to FIG. 8 and considering the method in greater detail, the test measurement period begins with a "flush" or clearing out of the portion of cache memory which is used to store data to be written to disk. The input to the analysis method according to the invention, is a vector of bin counts, that is, counts of the number of writes that have been completed, in other words, acknowledged to a host, in each of the bin time intervals within the measurement period. The measurement period can be, for example, three minutes in length. The I/O counts at the beginning of the test are often quite variable and may show a downward trend with large drops. These drops look like real transitions, but cannot be transitions since not enough writes have been sent to the system to exhaust the initially cleared write cache. The easiest and most effective way to deal with this type of behavior is to specify the number of bins at the beginning of the test in which a transition cannot occur. By default, according to this embodiment of the invention, the first 20 bins (or five seconds of data) are ignored.

Now, suppose there are N bins remaining after the initial bins have been dropped.
Let $$X=(X[1], X[2], \ldots, X[N])$$

be a vector ordering the bin counts, X[i], in the N intervals. X[i] is then the number of writes that completed in the i-th interval (after the first ignored bin intervals). Since the intervals are of fixed width, X[i] is proportional to the I/O rate in the i-th interval and the plots in FIGS. 1, 4–6 are essentially plots of X[i] vs. i. If there is a transition between fast and delayed fast writes then there should be a transition interval of bin counts where the I/O rate goes from high to low. The method identifies the transition region by looking at differences between the elements of X. Let G be a matrix of size (N−1)×K. The first column of G will be the matrix of gaps of transition length 1

$$(X[1]-X[2], X[2]-X[3], \ldots, X[N-1]-X[N]).$$

The first N−2 elements of the second column of G represent the gaps of length 2. The last element is designated "NA" for missing. The second column of G is $$(X[1]-X[3], X[2]-X[4], \ldots, X[N-2]-X[N], NA).$$

In general the j-th column of G has the N−j gaps of length j and (j−1) NAs, that is, $$(X[1]-X[j+1], X[2]-X[j+2], \ldots, X[N-j]-X[N], NA, \ldots, NA).$$

Since X[i] is proportional to the I/O rate in the i-th interval, the first column of G is proportional to changes in I/O rate from one interval to the next, or equivalently it is proportional to the I/O rate changes over a transition intervals of length 1. The j-th column of G is proportional to the changes in I/O rates over transition intervals of length j.

The non-NA elements of the i-th row of G, $$(X[i]-X[i+1], X[i]-X[i+2], X[i]-X[i+3], \ldots)$$

are proportional to the I/O rate changes over transition intervals of varying length where the first point in the transition interval is the first point in the interval which corresponds to bin count X[i].

The columns of G provide information about the significance of gaps of a fixed length. The rows of G provide information about the significance of gaps starting at a given point. Elements of G with large values indicate possible transition intervals. In order to assess what "large" means, a scaling vector, S, is determined with one element corresponding to each column of G. Denote the vector S by $$S=(S[1], S[2], \ldots, S[K]).$$

"K," by default 12 in this embodiment, is the maximum length of the transition interval to be considered. This value is given by the variable "max.tran.width" as detailed below. The i-th element of S is a robust measure of the spread of the gaps of length i.

A common measure of a batch of numbers is the standard deviation. The problem with the standard deviation is that it is sensitive to outliers. Thus, one large value can cause a significant increase in the standard deviation. Many robust alternatives to the standard deviation have been proposed which essentially discount the outliers when computing a measure of spread. If the numbers in the batch are normalized by the measure of spread, then a robust measure will result in higher normalized values for outliers and they will be easier to identify. Intuitively a transition from fast write to delayed fast write corresponds to a large change in I/O rate over a transition interval, and this value will be viewed as an outlier. By normalizing, using a robust measure of spread, a real transition interval should be easier to spot. There are many choices of robust estimators of spread. A choice that is easy to understand, that is computationally tractable, and that is adequate for write analysis is the median absolute deviation or "mad." The "mad" of a set of numbers Y[1], . . . , Y[n] is equal to $$\text{Constant}*\text{median}(\text{abs}(Y[i]-\text{median}(Y[i])))$$

Where "abs" denotes absolute value and "median(Y[i])" is the median of Y[i]'s. The scaled gaps (the original gap size divided by the scaling (or spread) factor for the gap) are used to the assess the significance of the I/O rate change across prospective transition intervals. Small values indicate that a transition has not occurred over the corresponding interval.

If one now defines Scaled.GAP to be the (N−1)×K matrix obtained from the matrix G by dividing each element of the i-th column of G by S[i], then the elements of Scaled.GAP are the normalized gaps of lengths 1 through K, or equivalently, normalized I/O rate changes over transition intervals of lengths 1 through K.

With this background understanding, the operation of the method is described in more detail, referring to FIG. 8, as the following steps are performed.

The behavior of the bin counts is often erratic at the very beginning of the test. In particular, there are often a few very high bin counts followed by lower counts, which gives the appearance of a transition, except that not enough I/O's could have been done to reach the system write pending limit. For this reason the initial del.init.bins are dropped, at 200, and only the remaining bin counts are used in the determination of transition intervals. These dropped initial intervals are accounted for when the fast and delayed fast write interval end points are returned. By default, del.init-.bins is the minimum of the number of bins in 5 seconds of run time (20 with a bin size of 0.25 seconds) and ¼ of total number of bins collected. Let X denote the bin counts after the initial counts are dropped. The length of X is n.bins, at 202.

The basic idea of the method is then to identify large drops, or gaps, in the bin counts. Two matrices are computed based on these gaps. The first matrix G, at 204, is an (n.bins−1)×(max.tran.width) matrix whose I-th column consists of the (n.bins-I) gaps of length I followed by (I−1) missing values. The second matrix, called Scaled.G, at 208, is an (n.bins−1)×(max.tran.width) matrix of scaled gaps. The I-th column of Scaled.G is the I-th column of G divided by a robust measure of spread. The parameter max.tran.width is the maximum width of a transition interval that will be considered. Its default value is 12 (corresponding to a 3 second transition interval when the default bin.secs value of 0.25 seconds is used). A maximum transition interval is specified because in practice a real transition should occur over a short time interval and to minimize the computational effort to locate the real transition interval. The matrix Scaled.G is used, as described below, to identify a small set of candidate transition intervals for further analysis.

The I-th column of Scaled.G is the I-th column of G, scaled by a robust estimate of scale of gaps of length I. The actual I/O rate varies considerably across tests as factors such as configuration and request size are varied. Scaled gaps are independent of the actual values so one can define rules to access their "significance" which are independent of the actual values. Each factor is scaled by a different value because gaps of different lengths may vary differently. The estimate used to scale the I-th column, is this embodiment of the invention, is the median absolute deviation, "mad", although other robust estimates would work as well, of the gaps of length I. This is indicated at 208.

The matrix Scaled.G is examined, at 210, to determine those entries which are significantly large and therefore, represent possible transition intervals. A cutoff value is determined for each column of Scaled.G. A quantile of the non-missing values in each column is computed at 214. The quantile is specified by the parameter gap.quantile, which is 0.95 by default. The 0.95 quantile is a value such that 95% of the gaps of length 1 are less that the value and 5% are greater. The cutoff value for the I-th column is taken to be the maximum of this quantile and the value of the parameter min.scaled.gap, which has a default value of 2. Using the 0.95 quantile as cutoff would mean that approximately 5% of the values in the I-th column would be retained for further consideration as transition intervals. If the scaled gaps of length 1 have a normal (bell curve) shape than approximately 2.5% of them would be greater than their mean value by 1.96 or more. If the scaled gaps are more highly concentrated than a normal distribution would suggest, then the cutoff value will be 2, otherwise it will be the 95% quantile (or whatever quantile is specified by gap.quantile). In either case 95+% of the gaps of length 1 should be eliminated.

If the max value in Scaled.G is large, at 210, then there is evidence of a transition and the processing of gaps should continue. If not, then one further check for a transition is done as described below. A large element in Scaled.G is defined as one greater than the value of the parameter min.max.scaled.gap, which is 6 by default.

If there is a large element of Scaled.G then:

Using the cutoff values, at 214, the elements in Scaled.G less than the corresponding cutoff value, at 220, are flagged to be dropped at 222. In addition, if Scaled.$G_{I,J}$ is the element in the I-th row and J-th column of Scaled.G and is not significant, at 220, that is, is less than or equal to the cutoff value for the I-th column, then all the elements on the diagonal $$\ldots, \text{Scaled}.G_{(I+J)(J-1)}, \text{Scaled}.G_{I,J}, \text{Scaled}.G_{(I-1)(J+1)}, \ldots$$

are flagged to be dropped. The elements to be dropped from consideration lie on the diagonal of Scaled.G starting with Scaled.G[i,j]. If the gap from $X_I$ to $X_J$ is not significant, but the gap from $X_K$ to $X_J$ is, where K is less than j, we should really be considering the gap between $X_K$ and $X_J$, since we have already eliminated the gap between $X_I$ and $X_J$. In terms of Scaled.G, if Scaled.$G_{I,J}$ is not significant then Scaled.$G_K$ $(J+(I-K))$ is also not significant. This means that once Scaled.$G_{I,J}$ has been flagged to be dropped then all elements on the upper right diagonal starting with Scaled.$G_{I,J}$ should also be flagged at 222. The elements on the lower left diagonal should also be flagged at 222. If the gap from $X_I$ to $X_J$ is not significant and K is between I and J then $X_I$ and $X_J$ must be comparable and $X_K$ must be greater than $X_J$. Therefore, in going from I to K to J, the I/O rate must go from low to high to low, in which case the transition from $X_K$ to $X_J$ does not represent a real transition.

A second attempt is made to flag intervals to be dropped. If a gap from $X_I$ to $X_J$ represents a transition, then the gap from $X_I$ to $X_K$, for K=I+1, I+2, . . . , J−1 should be significant (otherwise the gap from $X_I$ to $X_J$ could be replaced by the gap from $X_K$ to $X_J$ for some K between I and J, where the gap from $X_I$ to $X_K$ is not significant). Each row of G is examined at 224 to check this condition. Each element of the row is divided by the robust estimate of scale for gaps of length 1. If any of the first (max.tran.width−1) elements (or the remaining elements to the end of the input bin counts if there are less than max.tran.width to the end) of the scaled row is not greater than the cutoff for gaps of length 1, at 226, then the row is marked to be dropped from further consideration at 226, 228.

All of the elements marked for deletion in the previous two paragraphs are set to 0. The resulting matrix is called Gap.corrected. If any of the elements of gap.corrected are greater than the cutoff for gaps of length 1 then the corresponding intervals are checked at 230 to determine if there is a real transition interval and, if so, which one. If none are greater, then it is concluded that there are no transition intervals associated with large gaps.

Further checks on transition intervals associated with large gaps follow.

At this point possible transition gaps have been identified based on the size of the gap. When write tests are performed in the system, the system is driven hard enough so that once the write pending limit is reached and a transition to delayed fast write occurs, the system remains in the delayed fast write state for the duration of the test. Spurious transitions sometimes occur where there is a large gap, but the system subsequently recovers. For each potential transition interval the corresponding delayed fast write interval is then examined to see if the lower I/O rates persist. The gap from the last point in the transition interval and each of the subsequent points is computed and scaled by the robust scale estimate for gaps of length 1. If more the 10% of the resulting scaled gaps are less than the cutoff for gaps of length 1 then the low I/O rate is does not persist and a transition does not occur. These intervals are also deleted from further consideration at 230.

The remaining potential transition intervals are examined at 232 to determine if the left end point can be moved to the right. The idea is that there might be a small drop from $X_I$ to $X_K$ and a large drop from $X_K$ to $X_J$ such that the interval from $X_I$ to $X_J$ is still considered significant. The intent is to recognize situations in which someone viewing the graph would decide that the real drop actually occurs between $X_K$ and $X_J$. For each prospective transition the left end point is moved to the right as long as the scaled.gap between the left end point and the new position is less than 1.3 times the cutoff for gaps of length 1.

The gap with the largest corresponding scaled gap is the estimated transition interval at 234. If enough bins are in the resulting delayed fast write interval for accurate estimation of the delayed fast write I/O rate then the fast and delayed fast write intervals are returned. If not enough bins are in the delayed fast write interval then only the fast write interval is returned. The minimum number of bins in the delayed fast write interval is given by the parameter del.end.bins, which by default is equal to the minimum of the number of bins in 10 seconds (40 using the default bin.secs of 0.25) and ¼ of the total number of bin counts input to the function.

No transition interval is identified based on large gaps.

Figure 9:
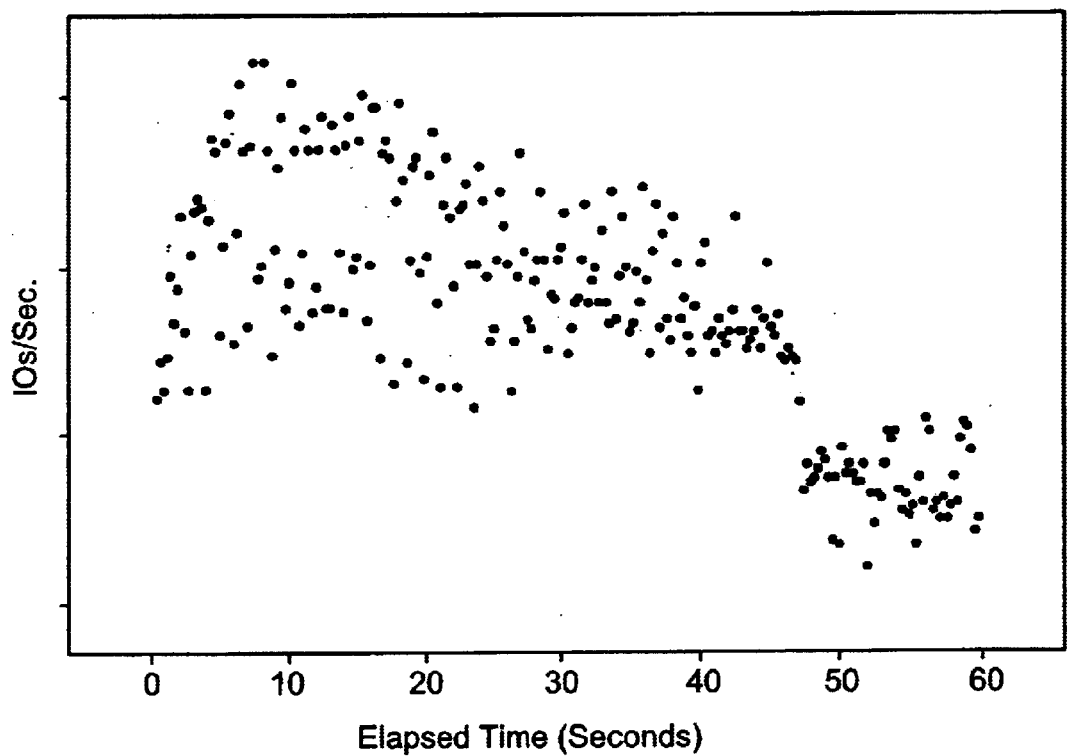
FIG. 9 is a plot of I/O's versus time for a storage system.

If the method reaches this point then no large scaled gaps have been identified which might indicate a transition. The method could return a fast write interval with no delayed fast write interval. However, in a small number of cases, less than 5% in the tests observed, there are transitions where the I/Os/Sec. vs. Elapsed Time plot is characterized by an initial high I/O rate and large variability followed by a region of low I/O rate and high variability. FIG. 9 shows such an example. There is clearly a transition at about 47 seconds, however the gaps in the region of the transition are not particularly large. The method can be enhanced to detect such situations.

Figure 10:
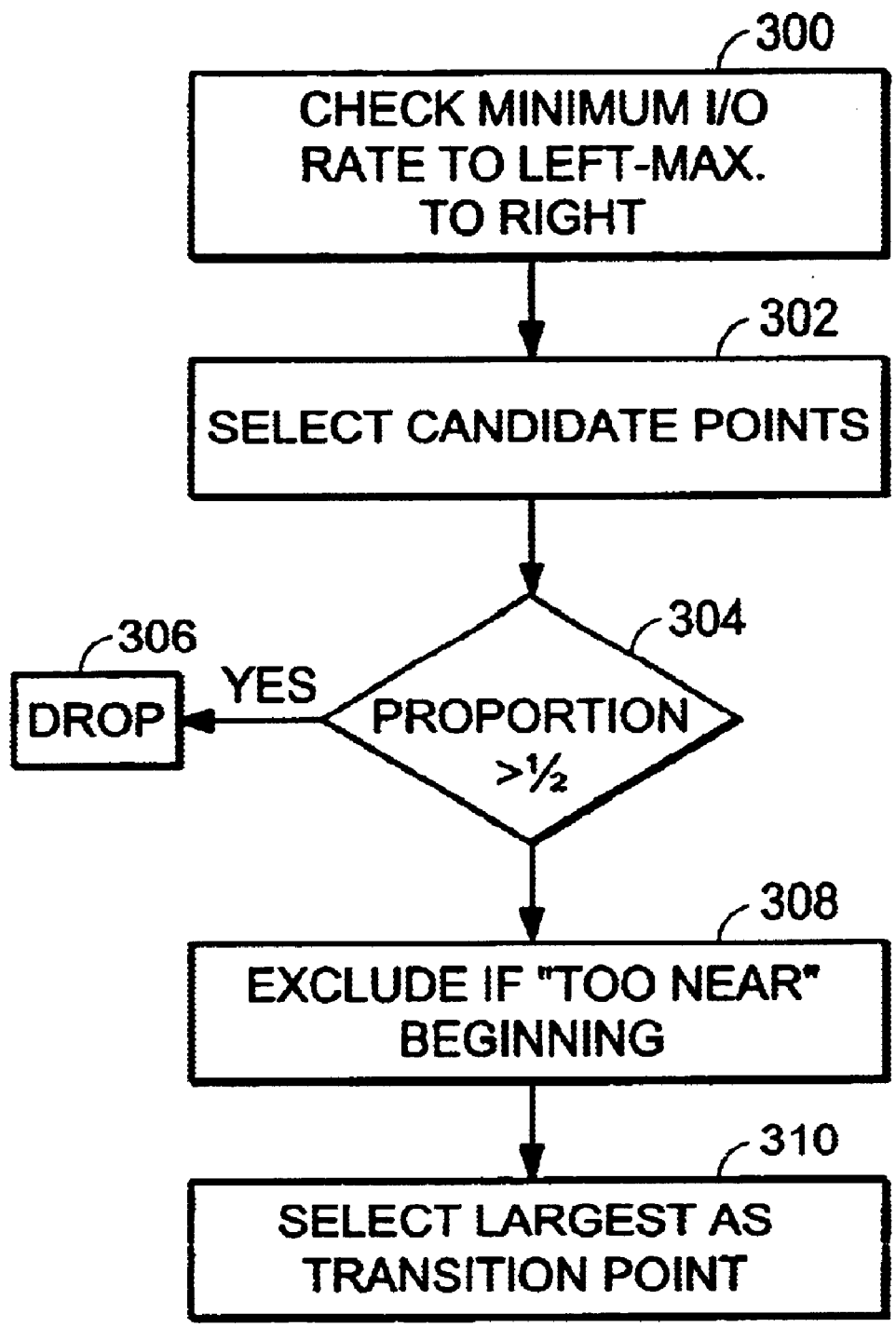
FIG. 10 is a flow chart of further enhanced processing of rejected points.

The method must now (in connection with 212, 228) allow for transitions, such as those in FIG. 9, without identifying potential transitions that had already been rejected as not real. The assumption is made that the transition, if there is one, occurs at a single point, that is, the length of the transition interval is one. Referring to FIG. 10, each point is examined at 300 to see if the minimum I/O rate to the left of the point minus the maximum I/O rate to the right of the point (this difference will be referred to as min.minus.max in the following discussion) is greater than the value of the parameter min.start.end.diff, which is 0 by default. Those points for which this is true are candidates for the transition points (more accurately they would be the last point in the fast write interval and the next point would be the first point in the delayed fast write interval). Many plots exhibit a general downward trend over all, or portions of, the test period, but do not have a real transition from high to low. Such plots would yield many candidate transition points based on the min I/O rate minus the max I/O rate procedure as described thus far. A method to screen out the spurious points, at 302, is based on the observation that in FIG. 9 many of the points before the true transition point have I/O rates comparable to those at the transition point and many of the points following the transition point have I/O rates comparable to the I/O rate at the point following the transition point. For each candidate point, the proportion of points preceding it that have bin counts that are greater than the bin count of the candidate point by a specified amount is computed. The "specified amount" is 3 times the scale for gaps of length 1 as previously computed.

If $X_I$ is the candidate point, then this is the proportion of the points such that $X_R-X_I>3*gap.scale[1]$ for R=1,2, . . . (I-1). If this proportion is greater than ½, at 304, the candidate point is dropped, at 306, from further consideration. In other words, at least half of the proceeding points should bin counts that are not too much larger than the bin count of the candidate point. For the point following the candidate point, $X_{I+1}$, the proportion of following points with bin counts that are less than $X_{I+1}$ by more than a specified amount is computed. If this proportion is greater than ½, the candidate point is excluded from further consideration. The same limit, 3 times the scale for gaps of length 1, is used. This is the proportion of the points such that $X_{I+1}-X_R>3*gap.scale[1]$ for R=(I+2), (I+3), . . . ,(n.bins-1).

The remaining candidate points, if any, after this screening are checked to see if they occur near the beginning of the measurement period. If they are too near the beginning then they are excluded at 308. "Too near" is defined as within the first 60 points or within the first 3*del.init.bins, whichever is less. If there are any remaining candidate points then the one with the largest value of max.minus.min is selected as the transition point at 310. Points defining fast and delayed intervals are computed. If the delayed fast write interval occurs too close to the end of the test (within the last del.end.bins) then only the fast write interval is returned; otherwise the fast and delayed fast write intervals are returned. If there are no remaining points then no transition has occurred and the interval containing all the bin counts is returned as the fast write interval.

The write analysis is useful for performance evaluations as described, for example, in systems described in U.S. Pat. No. 5,953,589, issued Sep. 14, 1999, entitled BENCHMARK TOOL FOR A MASS STORAGE SYSTEM and U.S. Pat. No. 5,898,863, issued Apr. 27, 1999, entitled METHOD AND APPARATUS FOR DETERMINING I/O SIZE DISTRIBUTION OF AN INPUT/OUTPUT SYSTEM AND ITS USE FOR LOAD SIMULATION, which are hereby incorporated, herein, in their entirety.

Additions, subtractions, and other modifications of the illustrated embodiment of the invention will be apparent to those practiced in this field and are within the scope of the following claims.

What is claimed is:

1. A method for measuring write system performance in a mass storage system, the storage system having a plurality of disk drive storage elements controlled by a disk drive controller, said controller receiving write commands and data from at least one host computer, and using a cache memory in which all received data is stored and from which it is destaged, said method comprising clearing a data storage area of the cache memory, sending test results representing write times for storage of received data to a system analysis program, quantizing said write times data to generate a representation of an I/O rate versus quantized times, and automatically determining a fast write to delayed fast write transition interval in said write times data.

2. The method of claim 1 further comprising initializing said controller cache memory to a known state prior to said sending of write commands.

3. The method of claim 2 further comprising analyzing, at the one host computer, performance data of said transition interval data, and generating a write analysis of said system performance.

4. The method of claim 2 further comprising determining, for said test results, the number of I/O writes as a function of time for said mass storage system.

5. The method of claim 1 further comprising deleting a beginning period of test data from determining said transition.

6. The method of claim 1 further comprising eliminating transitions too close to an end of said test duration.

7. Software stored on a computer readable medium to perform the function of measuring write system performance in a mass storage system, the storage system having a plurality of disk drive storage elements controlled by a disk drive controller, said controller receiving write commands and data from at least one host computer, and using a cache memory in which all received data is stored and from which it is destaged, said function comprising clearing a data storage area of the cache memory, sending test results representing write times for storage of received data to a system analysis program, quantizing said write times data to generate a representation of an I/O rate versus quantized times, and automatically determining a fast write to delayed fast write transition interval in said write times data.

8. The software of claim 7 further comprising the function of initializing said controller cache memory to a known state prior to said sending of write commands.

9. The software of claim 8 further comprising the function of analyzing, at the one host computer, performance data of said transition interval data, and generating a write analysis of said system performance.

10. The software of claim 8 further comprising the function of determining, for said test results, the number of I/O writes as a function of time for said mass storage system.

11. The software of claim 7 further comprising the function of deleting a beginning period of test data from determining said transition.

12. The software of claim 7 further comprising the function of eliminating transitions too close to an end of said test duration.

* * * * *